United States Patent
Guo et al.

(10) Patent No.: US 9,851,601 B2
(45) Date of Patent: *Dec. 26, 2017

(54) COLOR FILTER SUBSTRATE, LIQUID CRYSTAL DISPLAY PANEL AND DISPERSING METHOD OF MONOCOLOR QUANTUM DOTS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN); Ang Xiao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,747

(22) Filed: Mar. 7, 2016

(65) Prior Publication Data

US 2016/0187721 A1 Jun. 30, 2016

Related U.S. Application Data

(62) Division of application No. 14/360,517, filed as application No. PCT/CN2013/084971 on Oct. 10, 2013, now Pat. No. 9,354,465.

(30) Foreign Application Priority Data

Jul. 24, 2013 (CN) .......................... 2013 1 0314014

(51) Int. Cl.
*G02F 1/1333* (2006.01)
*G02F 1/1335* (2006.01)
(Continued)

(52) U.S. Cl.
CPC ......... *G02F 1/133516* (2013.01); *B05D 1/28* (2013.01); *B05D 3/007* (2013.01);
(Continued)

(58) Field of Classification Search
CPC .... G02F 1/13; G02F 1/1335; G02F 1/133514; G02F 1/1333; G02F 2001/01791;
(Continued)

(56) References Cited

U.S. PATENT DOCUMENTS 8,593,590 B2    11/2013  Jung
9,434,834 B1*   9/2016   Redmond ............ C08K 5/1535
(Continued)

FOREIGN PATENT DOCUMENTS

CN    102280590 A    12/2011
CN    102944943 A    2/2013
(Continued)

OTHER PUBLICATIONS

International Search Report dated Apr. 25, 2014; PCT/CN2013/084971.
(Continued)

*Primary Examiner* — Thoi Duong
(74) *Attorney, Agent, or Firm* — Ladas & Parry LLP

(57) ABSTRACT

A color filter substrate is provided with a layered structure containing monocolor quantum dots in areas of sub-pixels of at least one color of the pixels, and the layered structure is formed by laminating flake graphene layers and monocolor quantum dot layers alternatively. The color filter substrate can efficiently convert background light into monochromatic light, can increase the color gamut of the liquid crystal
(Continued)

display panel, enhances color saturation, and improves display quality of the display screen.

12 Claims, 7 Drawing Sheets

(51) Int. Cl.
*G02B 5/20* (2006.01)
*B05D 3/00* (2006.01)
*B05D 7/00* (2006.01)
*B05D 1/28* (2006.01)
*B82Y 20/00* (2011.01)
*B82Y 40/00* (2011.01)

(52) U.S. Cl.
CPC ............ *B05D 7/584* (2013.01); *G02B 5/201* (2013.01); *G02F 1/133514* (2013.01); *G02F 1/133528* (2013.01); *G02F 1/133617* (2013.01); *B82Y 20/00* (2013.01); *B82Y 40/00* (2013.01)

(58) Field of Classification Search
CPC .... A61K 49/0093; B82Y 40/00; B82Y 30/00; B82Y 20/00; B82Y 10/00; B82Y 15/00; C08K 2201/011; H01L 29/1606; H01L 29/127; H01L 31/035218; H01L 2251/5369; H01L 51/0048; C01B 31/0438; C01B 31/0476; C01B 31/022; C01B 2202/00; C01B 2204/00; C01B 2204/02; C01B 2204/04
USPC ........ 977/774, 742, 750, 902, 938; 349/108, 349/106, 187, 61
See application file for complete search history.

(56) References Cited

U.S. PATENT DOCUMENTS

| | | |
|---|---|---|
| 2013/0056705 A1 | 3/2013 | Kim et al. |
| 2014/0110665 A1 | 4/2014 | Zhang et al. |
| 2014/0132890 A1 | 5/2014 | Zhang |
| 2015/0345745 A1* | 12/2015 | Asadi .................... H01L 33/641 362/84 |
| 2016/0276056 A1* | 9/2016 | Stolyarov ................ H01B 1/04 |

FOREIGN PATENT DOCUMENTS

| | | |
|---|---|---|
| CN | 102983230 A | 3/2013 |
| CN | 103000813 A | 3/2013 |
| KR | 20120059063 A | 6/2012 |
| KR | 20120067159 A | 6/2012 |

OTHER PUBLICATIONS

International Preliminary Report on Patentability dated Jan. 26, 2015; PCT/CN2013/084971.
First Chinese Office Action dated Jun. 23, 2015; Appln. No. 201310314014.6.
USPTO RR dated Oct. 15, 2015 in connection with U.S. Appl. No. 14/360,517.
USPTO Ex Porte Quayle Action dated Dec. 17, 2015 in connection with U.S. Appl. No. 14/360,517.
USPTO NOA dated Feb. 16, 2016 in connection with U.S. Appl. No. 14/360.517.
International Preliminary Report on Patentability dated Jan. 26, 2016; PCT/CN2013/084971.
International Search Report dated Apr. 25, 2014; Appln. No. PCT/CN2013/084971.

* cited by examiner

COLOR FILTER SUBSTRATE, LIQUID CRYSTAL DISPLAY PANEL AND DISPERSING METHOD OF MONOCOLOR QUANTUM DOTS

TECHNICAL FIELD

Embodiments of the present invention relate to a color filter substrate, a liquid crystal display panel, a display device and a dispersing method of monocolor quantum dots.

BACKGROUND

Quantum dots, also known as nanometer crystals, belong to one kind of nanometer particles formed of II-VI group or III-V group elements. Particle diameters of quantum dots are generally from 1 nm to 20 nm. Since electrons and holes are qunatumly localized, and continuous energy band structure becomes a structure having discrete energy levels, quantum dots emit fluorescent light after being excited.

Emission spectrum of quantum dots can be controlled by changing sizes of quantum dots. By changing the sizes and elementary composition of quantum dots, it is possible to make their emission spectrum to cover the entire visible light region. Taking CdTe quantum dots as an example, when their particle diameters increase from 2.5 nm to 4.0 nm, their emission wavelength may be red-shifted from 510 nm to 660 nm.

At present, by means of luminescence characteristics of quantum dots, it is possible to apply quantum dots as molecule probes to fluorescence labeling, or to display devices. For example, while using monocolor quantum dots as a light emitting source of a backlight module of a liquid crystal display panel, monocolor quantum dots emit monochromatic light after being exited by blue light LEDs for example, and the exited monochromatic light is mixed with the blue light to form white background light. This kind of backlight source has a large color gamut and can improve picture quality.

Due to the poor dispensity of nanometer order quantum dots in organic solvent, quantum dot aggregation occurs, when they are used to manufacture patterns, results in the phenomenon of quenching, which severely reduces quantum yield. Therefore, there has been no design presently in which quantum dots are applied to liquid crystal display panels.

SUMMARY

Embodiments of the present invention provide a color filter substrate, a liquid crystal display panel, a display device and a dispersing method of monocolor quantum dots to increase the color gamut of the display screen and hence improve picture quality.

One embodiment of the present invention provides a color filter substrate comprising: a base substrate; a plurality of pixels provided on the base substrate, each comprised of a plurality of sub-pixels of different colors; and a layered structure containing monocolor quantum dots disposed in areas corresponding to sub-pixels of at least one color of pixels. The layered structure comprises an alternate lamination of flake graphene layers and monocolor quantum dot layers. A bottom layer and a top layer of the layered structure are both flake graphene layers; and the monocolor quantum dots emit monochromatic light corresponding to a color of the sub-pixels after being excited.

For example, furthermore, in order to increase service life of monocolor quantum dots, the above-mentioned color filter substrate may further comprise: a protection layer covering the layered structure.

Another embodiment of the present invention further provides a liquid crystal display panel comprising: a color filter substrate, an array substrate and a liquid crystal layer between the color filter substrate and the array substrate, and the color filter substrate is the above-mentioned color filter substrate.

For example, furthermore, in order for the liquid crystal display panel to be able to display normally, the above-mentioned liquid crystal display panel may further comprise: a lower polarization sheet on one side of the array substrate opposite to the liquid crystal layer and an upper polarization sheet on one side of the layered structure facing the liquid crystal layer in the color filter substrate.

For example, furthermore, in order for the liquid crystal display panel to be able to display normally, the liquid crystal display panel can further comprise: a backlight module emitting blue light or ultraviolet light on one side of the array substrate opposite to the liquid crystal layer.

Yet another embodiment of the present invention further provides a display device comprising any of the above-mentioned liquid crystal display panels provided in embodiments of the present invention.

Yet another embodiment of the present invention further provides a dispersing method of monocolor quantum dots comprising: forming a first flake graphene layer on a base substrate; forming a pattern of monocolor quantum dots on the first flake graphene layer by a transfer print method; and forming a second flake graphene layer on the monocolor quantum dot layer.

For example, furthermore, in the above-mentioned method, the first flake graphene layer or second flake graphene layer is formed according to the following steps: mixing graphene powder, ethyl cellulose and organic solvent to obtain mixture solution; coating the mixture solution onto the base substrate or the monocolor quantum dot layer; and removing the organic solvent and ethyl cellulose in the mixture solution by drying and heating to obtain the first flake graphene layer formed on the base substrate or the second flake graphene layer formed on the monocolor quantum dot layer.

For example, furthermore, in the above-mentioned method, the graphene powder accounts for 1%-10% mass percent with respect to the ethyl cellulose; a sum of the graphene powder and the ethyl cellulose accounts for 20%-50% mass percent with respect to the organic solvent.

For example, furthermore, the organic solvent in the above-mentioned method may be ethanol.

For example, furthermore, in the above-mentioned method, forming of a pattern of monocolor quantum dots on the first flake graphene layer comprises: dipping a transfer print plate in the monocolor quantum dot solution; performing transfer printing with the transfer print plate carrying monocolor quantum dot solution on the first flake graphene layer of the base substrate; and drying the monocolor quantum dot solution on the first flake graphene layer to obtain the pattern of monocolor quantum dot layer formed on the first flake graphene layer.

BRIEF DESCRIPTION OF THE DRAWINGS

In order to clearly illustrate the technical solution of the embodiments of the invention, the drawings of the embodiments will be briefly described in the following; it is obvious

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Specific examples of the color filter substrate, the liquid crystal display panel and the display device and the dispersing method of monocolor quantum dots provided in embodiments of the present invention will be described in detail below.

Shapes and sizes of film layers in the accompanying drawings do not reflect the actual scales of the array substrate or the color filter substrate, with the only purpose for illustrating contents of the present invention.

Figure 1:
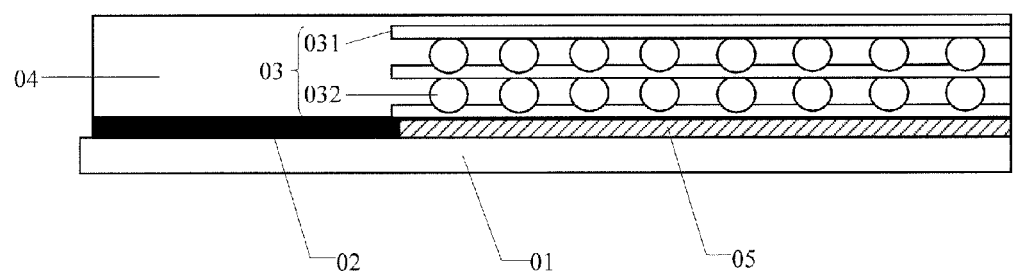
FIG. 1 is a structure diagram of a color filter substrate provided in an embodiment of the present invention.

An embodiment of the present invention provides a color filter substrate as illustrated in FIG. 1, and the color filter substrate includes a base substrate 01 and a black matrix 02 disposed on the base substrate 01. The pattern of the black matrix 02 defines a plurality of sub-pixel areas on the base substrate 01 (only one sub-pixel area is illustrated in FIG. 1) and every adjacent plurality of (two or more of) sub-pixel areas constitute one pixel area. The base substrate is for example a glass substrate or a plastic substrate. The black matrix 02 is fabricated from for example a black resin material or a metal oxide. For example, each pixel area includes red, green and blue sub-pixel areas.

The color filter substrate further includes: a layered structure 03 containing monocolor quantum dots provided in sub-pixel areas of at least one color of pixel areas. The layered structure 03 is formed by laminating flake graphene layers 031 and monocolor quantum dot layers 032 alternatively. The bottom layer and top layer of the layered structure 03 are both flake graphene layers 031. Monocolor quantum dots in the monocolor quantum dot layer 032, after being excited by light, emit monochromatic light of the color corresponding to the sub-pixel such as red or green. For example, the layered structure 03 contains three flake graphene layers 031 and two monocolor quantum dot layers 032 of which each is sandwiched between two flake graphene layers 031 respectively.

In the above-mentioned color filter substrate provided in an embodiment of the present invention, a layered structure containing monocolor quantum dots is used instead of conventional color resin as a color filter to convert the backlight into monochromatic light. Since the emission spectrum of monocolor quantum dots is narrow and their luminescence efficiency is high, it is possible to convert backlight efficiently into monochromatic light, which can increase the color gamut of the liquid crystal display panel, enhance color saturation and improve the display quality of the display screen.

Figure 2:
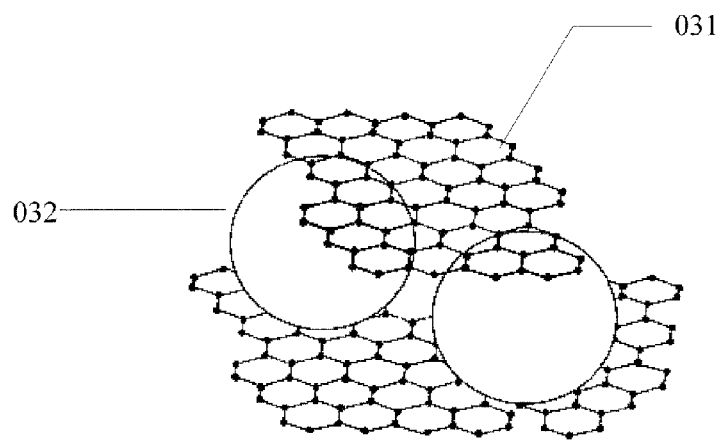
FIG. 2 is a structure diagram of a layered structure of the color filter substrate provided in an embodiment of the present invention.

Further, the process of laminating flake graphene layers 031 and monocolor quantum dot layers 032 alternately to form the layered structure 03 can disperse monocolor quantum dots uniformly between adjacent flake graphene layers 031, as illustrated in FIG. 2. This can prevent monocolor quantum dots from aggregating, enhance quantum yield of the quantum dots to improve light efficiency for quantum excitation. In addition, as illustrated in FIG. 2, a flake graphene layer 031 is arranged in a planar single layer of carbon atoms and has the characteristics of a two dimensional network structure. Therefore, the flake graphene layers 031 are transparent themselves, and will not influence normal display of liquid crystal display panel.

It is to be noted that the layered structure containing monocolor quantum dots described in embodiments of the present invention involves the case that quantum dots of sub-pixels of the same color are the same, and quantum dots of sub-pixels of different colors are different. Here, difference may be in size or material of the quantum dots, so long as it is ensured that quantum dots corresponding to sub-pixels of various colors, after being excited, emit only monochromatic light of the colors corresponding to the sub-pixels. That is, quantum dots of various sub-pixel areas of the layered structure containing monocolor quantum dots can only emit monochromatic light after being excited, but the areas corresponding to sub-pixel areas of different colors emit different monochromatic light.

In the present embodiment, traditional quantum dot materials may be adopted which may be at least one of zinc sulfide, zinc oxide, gallium nitride, zinc selenide, cadmium sulfide, gallium selenide, cadmium selenide, zinc telluride, cadmium telluride, gallium arsenide, indium phosphide, or lead telluride. Of course, materials for the quantum dots include, but not limited to the above listed, other materials with the properties same as or similar to the above-mentioned substances are also applicable. Taking zinc sulfide (ZnS) quantum dots as an example, quantum dots emitting red light have sizes mainly ranging 9~10 nm, quantum dots emitting yellow light have sizes of 8 nm or so, and quantum dots emitting green light have sizes of 7 nm or so.

Furthermore, in order to avoid the contact between monocolor quantum dot layers 032 in the layered structure 03 and the air, in the above-mentioned color filter substrate provided in embodiments of the present invention, a protection layer 04 covering the layered structure 03 may be further provided as illustrated in FIG. 1. The protection layer 04 is typically formed of an organic resin material, which can avoid contact of monocolor quantum dots with oxygen and water, increasing service life of monocolor quantum dots.

In the process of forming film layers of the color filter substrate, it is typically to form the pattern of black matrix 02 first on the base substrate 01, and the black matrix 02 defines a plurality of sub-pixel areas on the base substrate 01 to prevent light cross-talk from influencing display effect. In one example, in order to facilitate continuity of subsequently formed flake graphene in the same horizontal plane, as illustrated in FIG. 1, it is possible to provide a planarization layer 05 filling the hollow-out areas, namely sub-pixel areas in the pattern of the black matrix 02, and the planarization layer can planarize the surface of the base substrate 01. For example, the planarization layer 05 may be made of a resin material.

Figure 3:
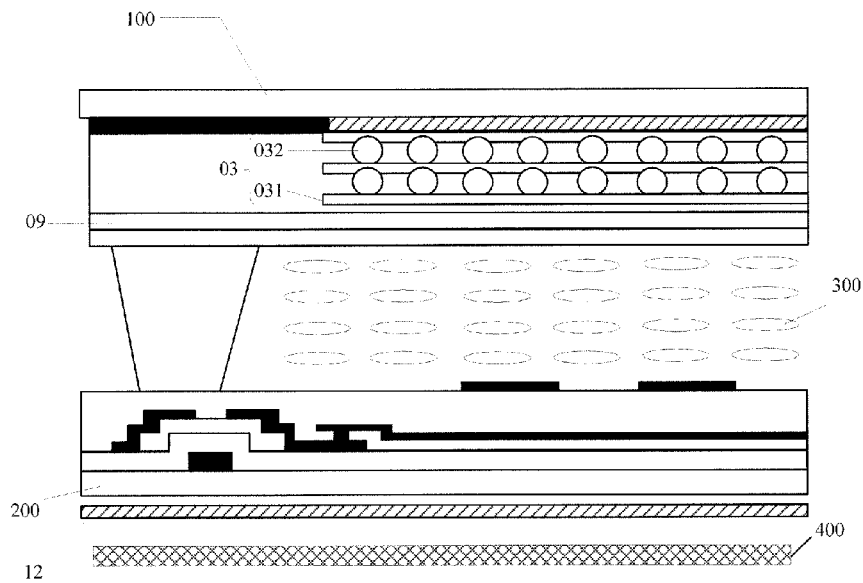
FIG. 3 is a structure diagram of a liquid crystal display panel provided in an embodiment of the present invention.

Another embodiment of the present invention further provides a liquid crystal display panel as illustrated in FIG. 3, and the liquid crystal display panel includes: a color filter substrate 100, an array substrate 200 and a liquid crystal layer 300 interposed between the color filter substrate 100 and the array substrate 200. The color filter substrate 100 is any of the above-mentioned color filter substrates provided in the embodiments of the present invention, while the array substrate 200 includes for example an array of sub-pixel areas corresponding to the array of sub-pixel areas of the color filter substrate 100. The pixel electrode of each sub-pixel area of the array substrate 200 is configured to form an electric field for controlling rotation degree of liquid crystal material, and hence carrying out display operation. The array substrate 100 and the color filter substrate 200 are disposed opposite to each other and assembled together with sealant to form a liquid crystal cell in which liquid crystal material is filled. These two substrates may be separated by spacers (column spacers or sphere spacers) to keep a certain gap therebetween. Since this liquid crystal display panel solves the problem with a principle similar to the aforementioned color filter substrates, examples of the liquid crystal display panel can be referred to the implementations of the color filter substrate, and repetition will not be described any longer here.

The above-mentioned liquid crystal display panel provided in embodiments of the present invention may be of various modes, such as the advanced super dimension switch (ADSDS) liquid crystal display panel that can realize wide view angle, and traditional twisted nematic (TN) liquid crystal display panel, which are not limited here.

For example, an ADSDS type liquid crystal display panel is described as an example for the above-mentioned liquid crystal display panel provided in the embodiments of the present invention. For example, for a TN type liquid crystal display panel, the color filter substrate may further include a common electrode layer on one side facing the liquid crystal layer for cooperating with pixel electrodes on the array substrate to form an electric field for driving liquid crystal materials.

For example, as illustrated in FIG. 3, the above-mentioned liquid crystal display panel may further comprise: a lower polarization sheet 12 on one side of the array substrate 2 opposite to the liquid crystal layer 300, and an upper polarization sheet 09 on one side of the layered structure 03 facing the liquid crystal layer 300 in the color filter substrate 100. The lower polarization sheet 12 on one side of the array substrate 200 opposite to the liquid crystal layer 300 may be manufactured by the process and material for manufacturing polarization sheets attached in a traditional liquid crystal display panel, which will not be described any longer here.

For example, the upper polarization sheet 09 may be manufactured with azo serial photosensitive resin(s), and then after directional ultraviolet illumination, the film with polarization effect is obtained by iodine solvent washing.

Furthermore, the upper polarization sheet 09 contained in the above-mentioned liquid crystal display panel provided in an embodiment of the present invention may also be provided for example by the process of attaching it on one side of the color filter substrate 100 opposite to the liquid crystal layer 300, and for example the same process and material for attaching the lower polarization sheet on one side of the array substrate 200 opposite to the liquid crystal layer 300 can be used, which is not limited here.

In the liquid crystal display panel provided in embodiments of the present invention, there may also be provided with a backlight module 400 on one side of the array substrate 200 opposite to the liquid crystal layer 300. For example, the backlight module 400 emits blue light with a central wavelength preferably at 450 nm such that monocolor quantum dots in the layered structure of the color filter substrate 100 emit corresponding monochromatic light after being excited. Of course, it is also possible to select near ultraviolet light as the backlight for exciting quantum dots depending on the selected excitation wavelength of quantum dots, which is not limited here.

When the above-mentioned liquid crystal screen provided in embodiments of the present invention is working, the blue light emitted by the backlight module 400 passes through the lower polarization sheet 12 and is modulated by the liquid crystal layer 300, then is incident onto the polarization sheet 09 that serves as a polarization layer. Then it is incident onto the layered structure 03 containing monocolor quantum dots. Monocolor quantum dots in various layered structures 03 generate corresponding monochromatic light while being excited by backlight, realizing liquid crystal color display panel.

Figure 4A:
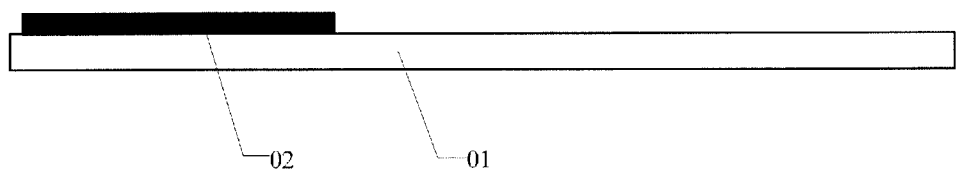
FIGS. 4a-4g are structure diagrams of steps of manufacturing color filter substrate in the liquid crystal display panel provided in an embodiment of the present invention.
Figure 4B:
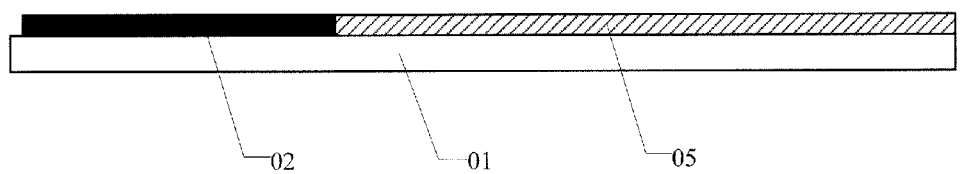
Figure 4C:
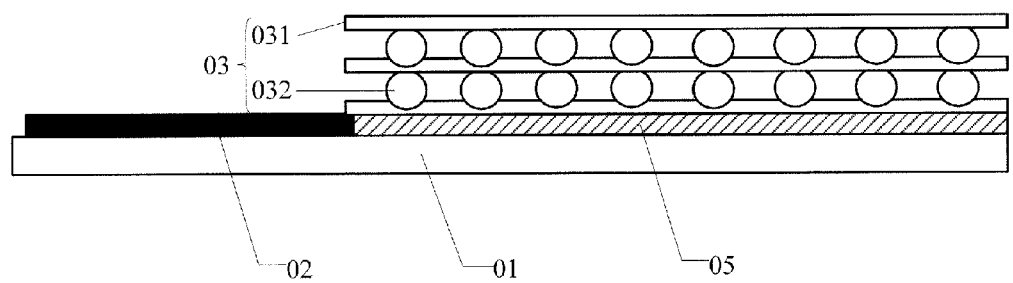
Figure 4D:
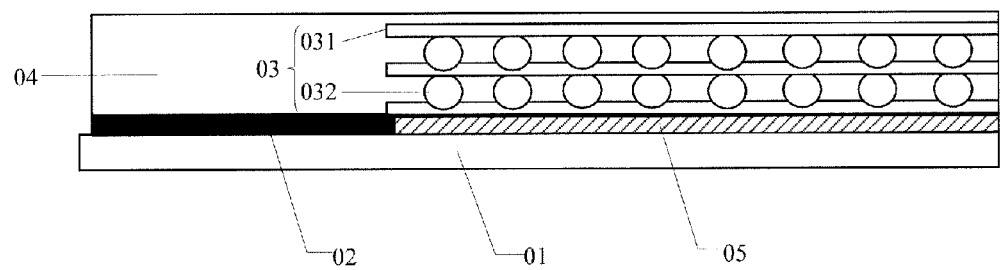
Figure 4E:
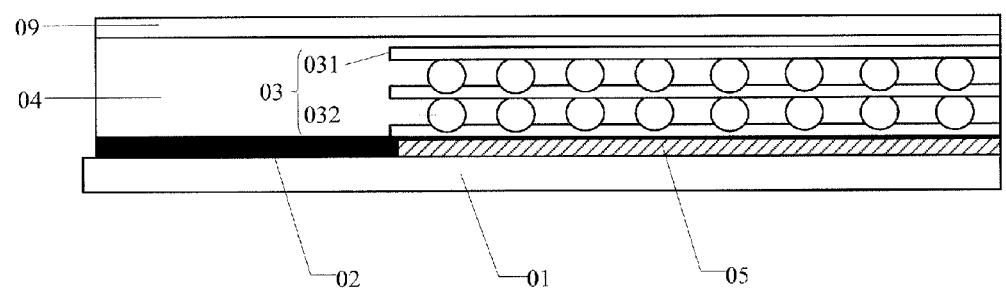
Figure 4F:
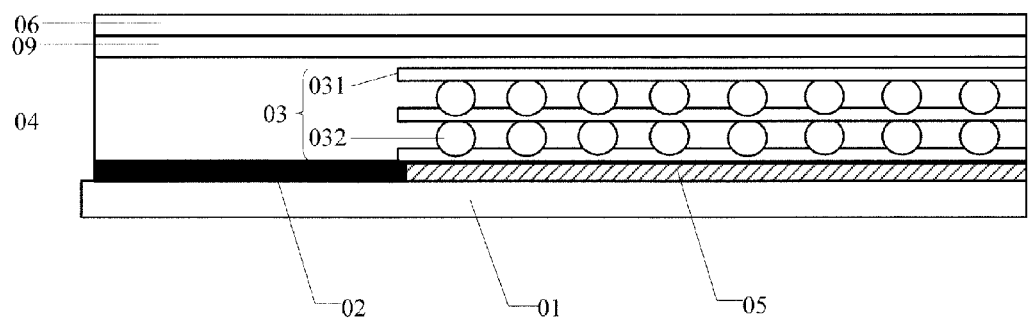
Figure 4G:
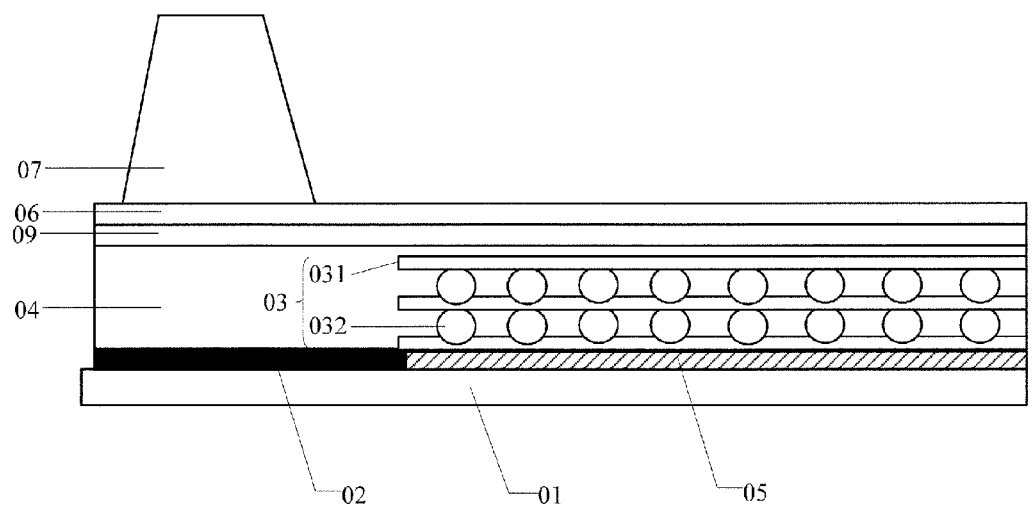

For example, the manufacturing process for the color filter substrate 100 provided with the upper polarization sheet 09 will be explained below, which includes the following steps:

(1) Forming a pattern of the black matrix 02 (BM) on the base substrate 01 by for example a printing or photography method as illustrated in FIG. 4a;

(2) Forming a planarization layer 05 on the hollow out areas, i.e., sub-pixel areas in the pattern of the black matrix 02, as illustrated in FIG. 4b;

(3) Manufacturing a layered structure 03 containing monocolor quantum dots on the planarization layer 05 which is formed by laminating flake graphene layers 031 and monocolor quantum dot layers 032 alternatively, as illustrated in FIG. 4c;

(4) Forming a protection layer 04 on the layered structure 03 as illustrated in FIG. 4d;

(5) Forming an upper polarization sheet 09 on the protection layer 04 as illustrated in FIG. 4e;

(6) Forming a passivation layer 06 on the upper polarization sheet 09 as illustrated in FIGS. 4f; and (7) Forming pillar like spacers 07 (PS) on the passivation layer 06 as illustrated in FIG. 4g.

Figure 5:
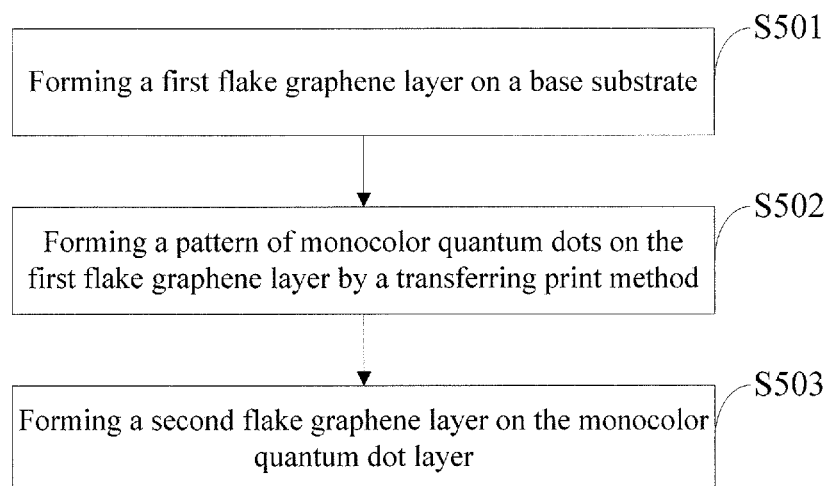
FIG. 5 is a flowchart of a dispersing method of monocolor quantum dots provided in an embodiment of the present invention.

For example, an embodiment of the present invention further provides a dispersing method of monocolor quantum dots as illustrated in FIG. 5, comprising the following steps:

S501. Forming a first flake graphene layer on a base substrate;

S502. Forming a pattern of monocolor quantum dots on the first flake graphene layer by a transferring print method;

S503. Forming a second flake graphene layer on the monocolor quantum dot layer.

For example, the first flake graphene layer in step S501 and the second flake graphene layer in step S503 may be formed according to the following steps:

(1) Mixing graphene powder, ethyl cellulose and organic solvent to obtain mixture solution.

The graphene powder accounts for 1%-10% mass percent with respect to the ethyl cellulose; a sum of graphene powder and ethyl cellulose accounts for 20%-50% mass percent with respect to the organic solvent.

For example, the organic solvent is ethanol, and of course may be other common organic solvent, which is not limited here.

For example, it is possible to add graphene powder and ethyl cellulose into the organic solvent first. Then, the organic solvent added with graphene powder and ethyl cellulose is placed in an oven, and a dissolution process is carried out under the condition of 80-100° C., preferably 90° C. Finally, after the graphene powder and ethyl cellulose are dissolved, the organic solvent with dissolved graphene powder and ethyl cellulose is subjected to ultrasonic processing to obtain the mixture solution.

Figure 6A:
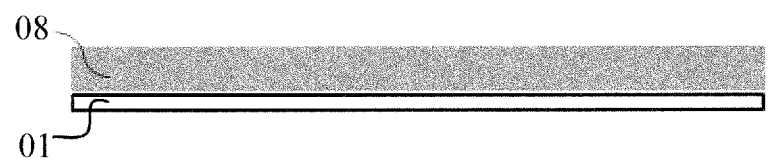
FIGS. 6a-6h are sketch maps of steps of the dispersing method of monocolor quantum dots provided in an embodiment of the present invention.

(2) Coating the mixture solution onto a base substrate or a monocolor quantum dot layer, for example as illustrated in FIG. 6a, in which the mixture solution 08 is coated onto the base substrate 01.

Figure 6B:

(3) Removing the organic solvent and ethyl cellulose in the mixture solution with drying and heating to obtain the first flake graphene layer formed on the base substrate or the second flake graphene layer formed on the monocolor quantum dot layer. For example, as illustrated in FIG. 6b, the first flake graphene layer 0311 is formed on the base substrate 01.

For example, it is possible to put the base substrate coated with mixture solution into an oven under 80-100° C. for drying for 12 hours, preferably under 90° C. Then, the oven is heated to about 400° C. for heating for 8 hours. Finally, it is naturally cooled down to the room temperature. Now the graphite is gradually layered and transformed into a transparent state. Preferably, in order to prevent foreign particles from dropping into the graphene surface layer, for example, the above-mentioned steps may be carried out in a dustless circumstance.

Figure 6C:
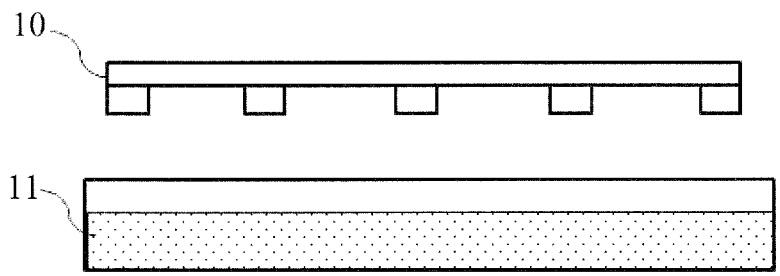

For example, forming a pattern of monocolor quantum dot layer on the first flake graphene layer in step S502 may be implemented by the following steps:

(1) Dipping a transferring print plate 10 in the monocolor quantum dot solution 11, as illustrated in FIG. 6c.

For example, in the monocolor quantum dot solution, the content of monocolor quantum dots is 0.1-5 wt %, and the solvent may be cyclohexane or other solvent with high polarity, such as toluene, ethyl acetate or benzene. Further, in order to prevent monocolor quantum dots from aggregation, the monocolor quantum dot solution may be subjected to ultrasonic dispersion for 3 hours first.

Figure 6D:
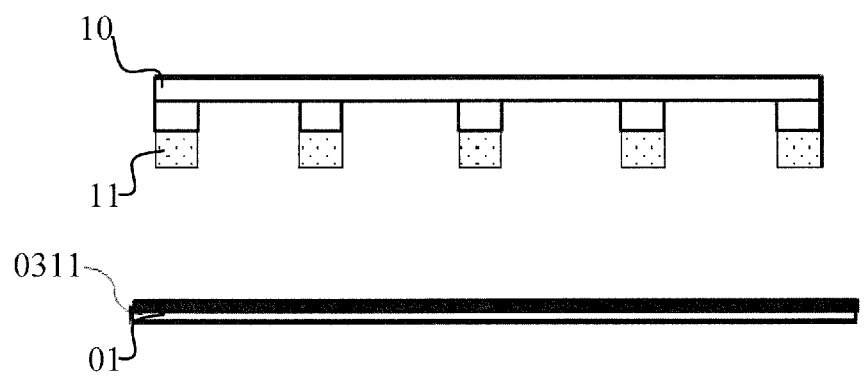
Figure 6E:
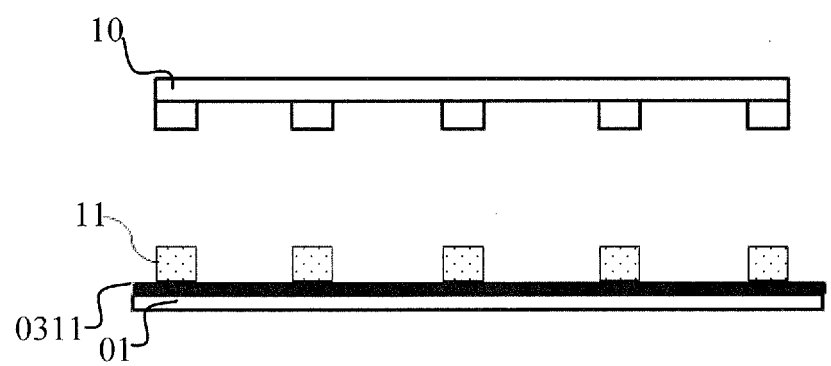

(2) On the first flake graphene layer 0311 of the base substrate 01, performing a transfer printing process with the transfer print plate 10 carrying monocolor quantum dot solution 11, as illustrated in FIGS. 6d and 6e.

Figure 6F:
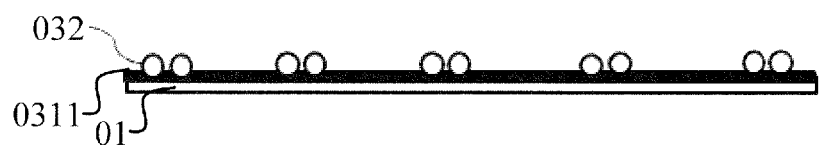

(3) Drying the monocolor quantum dot solution 11 on the first flake graphene layer 0311 to obtain a pattern of monocolor quantum dot layer 032 on the first flake graphene layer 0311, as illustrated in FIG. 6f. For example, it is possible to dry it under 100° C. for about 3 hours.

Figure 6G:
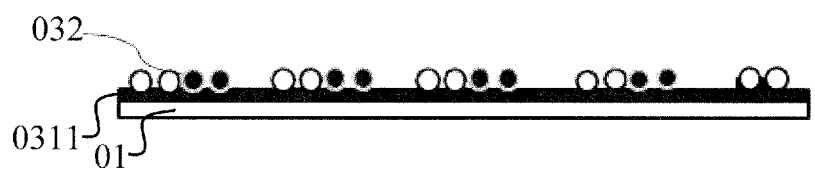

Then, the above-mentioned steps are repeated to transfer patterns of different monocolor quantum dot layers on the first flake graphene layer 0311 at other locations, as illustrated in FIG. 6g.

Figure 6H:

Finally, the second flake graphene layer 0312 is formed on the monocolor quantum dot layer 032, as illustrated in FIG. 6h.

An embodiment of the present invention further provides a display device comprising the aforementioned liquid crystal display panel and driving circuits operating in cooperation with the liquid crystal display panel. Since this device solves problems with a principle similar to that of the aforementioned liquid crystal display panel, the implementation of liquid crystal display panel may be referred to for the implementation of the device, and repetitions will not be described further here.

With the color filter substrate, the liquid crystal display panel, the display device and the dispersing method of monocolor quantum dots provided in embodiments of the present invention, a layered structure containing monocolor quantum dots is provided in sub-pixel areas of at least one colors in the pixels on the color filter substrate. The layered structure is formed by laminating flake graphene layers and monocolor quantum dot layers alternatively, and both bottom and top layers of the layered structure are flake graphene layers. Monocolor quantum dots emit monochromatic light corresponding to the color of sub-pixels after being excited. In embodiments of the present invention, a layered structure containing monocolor quantum dots is used instead of conventional color resin as a color filter to convert background light into monochromatic light. Since quantum dots have narrow emission spectrum and high luminescence efficiency, they can efficiently convert background light into monochromatic light, which can enhance color gamut of the liquid crystal display panel, enhance the color saturation and improve display quality of the display screen. Also, the process of forming the layered structure by laminating flake graphene layers and monocolor quantum dot layers alternatively allows the monocolor quantum dots to be uniformly dispersed between adjacent flake graphene layers, prevents monocolor quantum dots from accumulating, and increases quantum yield of quantum dots to improve light efficiency of quantum excitation.

What are described above is related to the illustrative embodiments of the disclosure only and not limitative to the scope of the disclosure; the scopes of the disclosure are defined by the accompanying claims.

The invention claimed is:

1. A dispersing method of monocolor quantum dots comprising:
   forming a first flake graphene layer on a base substrate;
   forming a pattern of a monocolor quantum dot layer on the first flake graphene layer with transfer method; and
   forming a second flake graphene layer on the monocolor quantum dot layer;
   wherein forming of the pattern of monocolor quantum dot layer on the first flake graphene layer comprises:
   dipping a transfer print plate in a monocolor quantum dot solution, the monocolor quantum dot solution comprising monocolor quantum dots and solvent;
   performing transfer printing with the transfer print plate carrying the monocolor quantum dot solution on the first flake graphene layer of the base substrate; and
   drying the monocolor quantum dot solution on the first flake graphene layer to obtain the pattern of monocolor quantum dot layer formed on the first flake graphene layer.

2. The method of claim 1, wherein forming of the first flake graphene layer or second flake graphene layer comprises:
   mixing graphene powder, ethyl cellulose and organic solvent to obtain a mixture solution;
   coating the mixture solution onto the base substrate or the monocolor quantum dot layer; and
   removing the organic solvent and ethyl cellulose in the mixture solution by drying to obtain the first flake graphene layer formed on the base substrate or the second flake graphene layer formed on the monocolor quantum dot layer.

3. The method of claim 2, wherein the graphene powder accounts for 1%-10% mass percent with respect to the ethyl cellulose; a sum of the graphene powder and the ethyl cellulose accounts for 20%-50% mass percent with respect to the organic solvent.

4. The method of claim 3, wherein the organic solvent is ethanol.

5. The method of claim 2, wherein the organic solvent is ethanol.

6. The method of claim 2, wherein mixing graphene powder, ethyl cellulose and organic solvent to obtain the mixture solution comprises:
   adding graphene powder and ethyl cellulose into the organic solvent;
   placing the organic solvent added with graphene powder and ethyl cellulose in an oven, and carrying out a dissolution process under a condition of 80-100° C.; and
   subjecting the organic solvent with dissolved graphene powder and ethyl cellulose to ultrasonic processing to obtain the mixture solution.

7. The method of claim 6, wherein carrying out a dissolution process under a condition of 90° C.

8. The method of claim 2, wherein the step of removing the organic solvent and ethyl cellulose in the mixture solution by drying to obtain the first flake graphene layer formed on the base substrate or the second flake graphene layer formed on the monocolor quantum dot layer is carried out in a dustless circumstance.

9. The method of claim 1, wherein in the monocolor quantum dot solution, a content of monocolor quantum dots is 0.1-5 wt %.

10. The method of claim 1, wherein before dipping the transfer print plate in the monocolor quantum dot solution, the monocolor quantum dot solution is subjected to ultrasonic dispersion.

11. The method of claim 1, wherein the solvent of the monocolor quantum dot solution comprises a solvent with high polarity.

12. The method of claim 11, wherein the solvent with high polarity comprises cyclohexane, toluene, ethyl acetate or benzene.

* * * * *